US008675625B2

(12) United States Patent
Cadenas Gonzalez et al.

(10) Patent No.: US 8,675,625 B2
(45) Date of Patent: Mar. 18, 2014

(54) ACCESS POINT WHICH SENDS GEOGRAPHICAL POSITIONING INFORMATION FROM THE ACCESS POINT TO MOBILE TERMINALS AND MOBILE TERMINAL WHICH RECEIVES THE INFORMATION AND ESTIMATES THE POSITION THEREOF BASED ON SAID INFORMATION

(75) Inventors: Alejandro Cadenas Gonzalez, Madrid (ES); Belén Carro Martinez, Madrid (ES); Antonio Javier Sanchez Esguevillas, Madrid (ES)

(73) Assignee: Telefonica, S.A., Madrid (ES)

( * ) Notice: Subject to any disclaimer, the term of this patent is extended or adjusted under 35 U.S.C. 154(b) by 180 days.

(21) Appl. No.: 13/056,964

(22) PCT Filed: Jul. 30, 2009

(86) PCT No.: PCT/ES2009/070322
§ 371 (c)(1),
(2), (4) Date: May 6, 2011

(87) PCT Pub. No.: WO2010/012854
PCT Pub. Date: Feb. 4, 2010

(65) Prior Publication Data
US 2011/0206025 A1 Aug. 25, 2011

(30) Foreign Application Priority Data
Aug. 1, 2008 (ES) .................................. 200802312

(51) Int. Cl.
*H04Q 7/24* (2006.01)

(52) U.S. Cl.
USPC ........................................ 370/338; 455/456.1

(58) Field of Classification Search
USPC ............ 370/338; 445/433, 41.2, 426.2, 456.1
See application file for complete search history.

(56) References Cited

U.S. PATENT DOCUMENTS

2004/0242230 A1* 12/2004 Rue .............................. 455/433
2006/0240840 A1* 10/2006 Morgan et al. ............. 455/456.1
2007/0202888 A1* 8/2007 Brachet et al. ............. 455/456.1
2009/0088182 A1* 4/2009 Piersol et al. .............. 455/456.1

FOREIGN PATENT DOCUMENTS

WO WO2007/082912 7/2007

OTHER PUBLICATIONS

3GPP, Universal Mobile Telecommunications System; Location Services; Functional Description; Stage 2, (1999) *ETSI*, France.

(Continued)

*Primary Examiner* — Wanda Z Russell
(74) *Attorney, Agent, or Firm* — Knobbe Martens Olson & Bear LLP

(57) ABSTRACT

An access point sends geographical positioning information from the access point to mobile terminals and to a mobile terminal which receives this information and estimates the position thereof based on said information. Geographical-locating architecture for WiFi 802.11 mobile terminals on ADSL access points generally includes geographical positioning information, i.e., the geographical coordinates of the access point during the registration phase thereof. The access point includes this geographical information in the information posted so that the mobile terminals can be connected to same. The mobile terminals can thus know the geographical location where they are located with an approximation that will depend directly on the number of access points that the mobile terminal can detect.

8 Claims, 3 Drawing Sheets

(56) References Cited

OTHER PUBLICATIONS

IEEE Standard for Information Technology—Telecommunications and Information Exchange Between Systems—Local and Metropolitan Area Networks—Specific Requirements; Part 11: Wireless LAN Medium Access Control (MAC) and Physical Layer (PHY) Specifications; Amendment 5: Enhancements for Higher Throughput, (2009) *IEEE Computer Society*, New York, NY.

Lloyd, et al., "PPP Authentication Protocols" *Network Working Group; Request for Comments*: 1334, (1992).

Simpson, "The Point-to-Point Protocol (PPP)" *Network Working Group; Request for Comments*: 1661, (1994).

Simpson, "PPP Challenge Handshake Authentication Protocol (CHAP)" *Network Working Group; Request for Comments*: 1994, (1996).

International Search Report dated Dec. 11, 2009, issued in International Application No. PCT/ES2009/070322.

* cited by examiner

ACCESS POINT WHICH SENDS GEOGRAPHICAL POSITIONING INFORMATION FROM THE ACCESS POINT TO MOBILE TERMINALS AND MOBILE TERMINAL WHICH RECEIVES THE INFORMATION AND ESTIMATES THE POSITION THEREOF BASED ON SAID INFORMATION

RELATED APPLICATIONS

This application is a U.S. National Phase of International Application No. PCT/ES2009/070322, filed Jul. 30, 2009, designating the U.S. and published on Feb. 4, 2010, 2007 as WO 2010/012854, which claims priority to Spanish Patent Application No. P200802312, filed Aug. 1, 2008. The content of these applications is incorporated herein by reference in its entirety.

BACKGROUND OF THE INVENTION

1. Technical Field

The present invention is applied to the field of the information and telecommunications technologies, more specifically, to end user-oriented wireless personal communications technologies through a non-cellular wireless communication protocol, such as 802.11 (in any of its standard versions), on PC, PDA or mobile telephony platforms, etc.

2. Description of the Related Art

Services in which geographical information is particularly relevant are widespread today. They are value-added services in the field of personal navigation, in emergency services with positional information, near-by service search services, tourism information, etc.

Services of this type are spreading as a result of the popularity of GPS navigation devices which are progressively being integrated in high-end mobile terminals. However, they are inaccessible for the mobile devices, PDAs or portable computers in which there is no GPS receiver, or in which there is a GPS receiver on board or connected via Bluetooth, but it does not have a clean LOS (Line Of Sight) connection with a set of positioning satellites, such as in indoor settings for example.

Knowing the geographical positioning information of a wireless device is fundamental for:

- being included in transactions started from the user of the mobile terminal against Internet servers in which knowing the approximate geographical position is relevant (map servers, etc.)
- the user of the mobile terminal to be able to know his approximate geographical position for obtaining services contextualized to his geographical position, such as for example, georeferencing photographs taken with his terminal and subsequently uploading them to a network server for storage.
- the mobile terminal to be able to launch emergency services accompanied by an approximate estimation of the location of the terminal.
- the user of the terminal to be able to enjoy geographical information-dependent services provided by the mobile telephony operator, such as conditioned diversions, georeferenced warnings, etc.
- implementing local data exploitation services in the mobile terminal by means of knowing the approximate position, such as, navigators in the terminal for example.

Mobile terminal locating methods for cellular-type access networks, which are defined in industry standards, are known.

However, there are still few proposals for implementing mobile terminal locating mechanisms in non-cellular wireless communication networks.

Some examples of non-cellular wireless communication systems which locate mobile terminals are discussed below:

Patent application US 2008/0042901 describes a proposal which is fundamentally aimed at defining software processes for obtaining an estimation of the geographical position from power measurements taken of the signal in wireless-type, but not necessarily cellular, devices.

The proposal described in patent application WO 2007/082912 is fundamentally oriented at obtaining a list of available hotspots in geographical positions, but not at locating the wireless terminal itself.

Therefore, one objective of the present invention is to provide new mechanisms for locating mobile terminals in wireless non-cellular networks, overcoming the limitations of known mechanisms.

DESCRIPTION OF THE INVENTION

To that end, according to one aspect of the invention, an access point according to independent claim 1, a mobile terminal according to independent claim 12 and methods according to independent claims 13 and 15 are provided. Dependent claims include particular embodiments of the invention.

According to one aspect of the invention, an access point for a non-cellular wireless communication system comprising means for sending data to one or more mobile terminals is provided. These means for sending data are configured for sending geographical positioning information from the access point to the mobile terminals. Therefore, the geographical positioning information will be publicly accessible from the mobile terminals which receive the signal from the access point.

According to another aspect of the invention, a mobile terminal for a non-cellular wireless communication system comprising means for receiving data from at least one access point is provided. These means for receiving the data are configured for receiving geographical positioning information from the access point. The mobile terminal comprises means for estimating the position of the mobile terminal based on the geographical positioning information received from the access point.

The geographical positioning information will be obtained by the non-cellular mobile terminal:

- in both indoor and outdoor settings,
- without needing an on-board GPS/A-GPS receiver,
- without needing to start data connections to external servers.

According to one embodiment of the invention, the means for sending the data from the access point are configured for sending the geographical positioning information by means of broadcast in beacons, preferably in a Service Set Identifier (SSID) defined in the WiFi or WiMax standard, or other wireless non-cellular technologies having a similar behavior. Therefore, an inference mode for inferring the geographical position of the mobile terminal only by means of receiving the broadcast information from the access points, together with the network identifier (given by the SSID), enabling the connection of the WiFi mobile terminals to a specific access point is implemented. Each WiFi mobile terminal can receive the signal from several near-by access points. In residential or commercial areas, the deployment density of WiFi access points means that on average, a WiFi terminal will detect an increasing mean number of access points which, in large cities and always depending on the type of area, will be above 3 detected accesses, making this invention viable in urban settings.

According to another embodiment, the access point comprises means for obtaining the geographical positioning information of an entity located in a telephone network, for example of a digital subscriber line access multiplexer (DSLAM). Said information is preferably obtained by the access point during a registration or access permission checking step. This registration process between the access point and the DSLAM is performed on the PPP PAP protocol (Point-to-Point Protocol Password Authentication Protocol) or PPP CHAP protocol (Point-to-Point Protocol Challenge Handshake Authentication Protocol), on the messages of which both the user credentials and the acceptance or refusal of the access permissions are transported to the access point.

In the registration process, the DSLAM access a database with user information and user passwords for accepting the request to access the access point or to refuse such request. The database will store the user information, including the access point telephone number. This number will be directly associated with a user subscription and to a specific postal address (city, street, number). This postal address will be directly associable with specific geographical coordinates by means of a simple translation process. Therefore, the geographical coordinates of the access point can be sent back to same in the registration phase when the user credentials are accepted for obtaining access to the IP network of the Internet Service Provider (ISP).

In the event that the access point does not have access to the user database for various reasons, the access point administrator could eventually provide the geographical coordinates to the access point by means of an administration interface.

According to an additional aspect of the invention, a method implemented in an access point for a non-cellular wireless communication system is provided, characterized in that it comprises the step of the access point sending geographical positioning information from the access point to mobile terminals.

The method preferably comprises the step of the access point obtaining the geographical positioning information of an entity located in a telephone network.

According to another aspect of the invention, a method implemented in a mobile terminal for a non-cellular wireless communication system is provided, characterized in that it comprises the step of receiving geographical positioning information from at least one access point and estimating the position of the mobile terminal based on the geographical positioning information received from the access point.

The methods are preferably implemented by means of a computer program.

These and other aspects of the invention will be evident from and clarified in reference to the embodiments described below.

BRIEF DESCRIPTION OF THE DRAWINGS

Other features and advantages of the invention will be more clearly understood from the following description of an embodiment, provided as a non-limiting example, with reference to the attached drawings.

In all the drawings, similar reference numbers refer to similar elements.

PREFERRED EMBODIMENTS OF THE INVENTION

Figure 1:
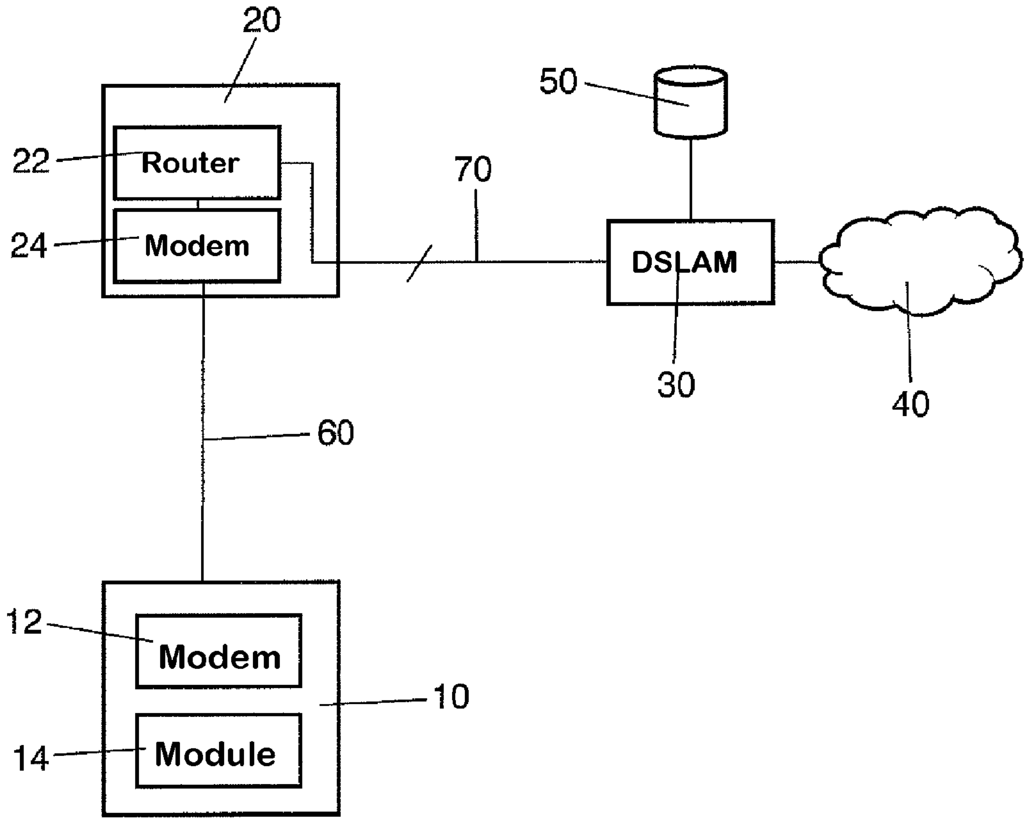
FIG. 1 shows the ADSL access architecture through an access point using the WiFi 802.11 protocol.

The elements forming the infrastructure for ADSL access through an access point using the WiFi 802.11 protocol are depicted in FIG. 1. FIG. 1 also shows the breakdown of the internal modules of the elements of the proposed architecture. These elements are functional, and therefore depending on the particular implementation of the solution, they can be aggregated in physical network elements in a different manner.

FIG. 1 shows a mobile terminal 10 or wireless device, comprising a MODEM 12 and a module 14 for estimating the position of the mobile terminal. The mobile terminal communicates with an access point 20 through an interface 60 according to the WiFi 802.11 protocol. The access point is connected by means of the subscriber twisted-pair cable to a telephone network, more specifically to a digital subscriber line access multiplexer (DSLAM) 30. This architecture allows the mobile terminal to access the IP network 40 of the Internet Service Provider. To determine if the user has the right to access the network, the DSLAM validates the credentials of the access point against the ADSL user database 50. This registration process between the access point and the DSLAM is performed on the PPP PAP protocol (Point-to-Point Protocol Password Authentication Protocol) or PPP CHAP protocol (Point-to-Point Protocol Challenge Handshake Authentication Protocol), 70 [1], [2], [3], on the messages of which both the user credentials and the acceptance or refusal of the access permissions are transported to the access point.

In the registration process, the DSLAM access a database with user information and user passwords for accepting the request to access the access point or to refuse such request.

This database will store the user information, including the geographical telephone number (+349XXXXXXXX) from which the access point starts the access process. This geographical number will be directly associated with a user subscription and with a specific postal address (city, street, number). This postal address will be directly associable with specific geographical coordinates by means of a simple translation process.

Therefore, the geographical coordinates of the access point can be sent back to same in the registration phase when the user credentials for obtaining access to the IP network of the Internet Service Provider are accepted.

In the event that the access point does not have access to the user database for various reasons, the access point administrator could eventually provide the geographical coordinates to the access point by means of an administration interface.

The access point WiFi publishes in beacons (see [4]), the information corresponding to the Service Set Identifier (SSID) which will identify the access point and the type of services offered by same, the timestamp of time of sending, for transmission delay measurements, and the approximate geographical position coordinates of the access point, which can be included in the Parameter Sets field in the same SSID, or in an additional ad-hoc field.

Therefore, the geographical position information will be publicly accessible from the wireless terminals (mobile terminals) which receive the signal of the access point.

The mobile terminal can estimate its geographical position in several ways. In the event that it only receives a signal from a single access point, it can only roughly estimate the position of the mobile terminal. The best estimation of the position will be the position of the access point itself, similarly to the Cell of Origin (CoO) based locating method in cellular telephony, as specified in [5]. It is possible to obtain an estimation of the reliability of the value of the position by means of power measurements taken of the signal received from the access point, however this will be very dependent on the capabilities of the terminal itself.

In the event that the mobile terminal receives geographical coordinate information from several of the detected access points, the position of the device itself with can be estimated more precisely. To that end, there are several recently developed techniques which can, in principle, be used. A non-comprehensive list of some of the possibilities is provided below.

Figure 2:
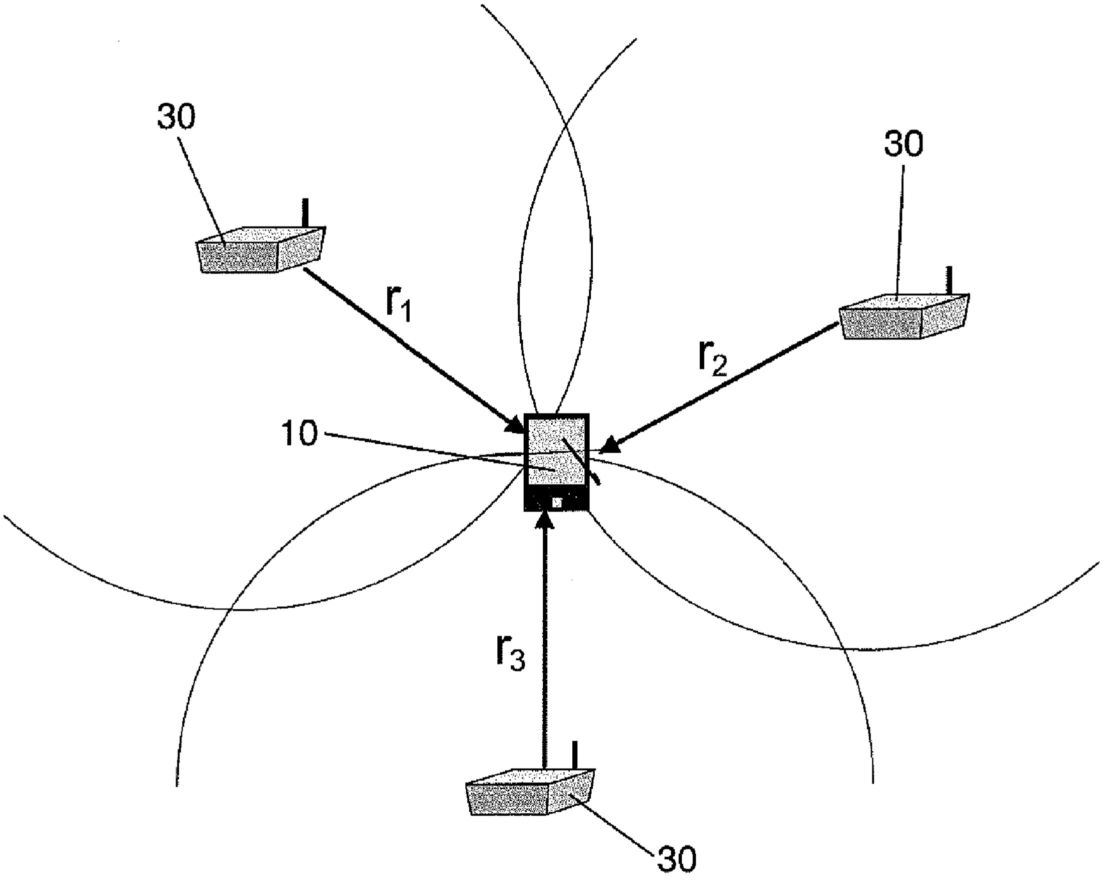
FIG. 2 shows a locating scenario by triangulation from three position signals from respective access points.

- Assigning the position of the mobile terminal (wireless) to the position of the access point the signal of which is received with a stronger power. This option has the advantage of requiring low processing power and complexity in the wireless terminal, but it obtains a less reliable position.
- Performing triangulation from the signals which are received with a similar power. To obtain a more reliable reading, it will be necessary to have three or more received signals, as depicted in FIG. 2. In the event that the power with which the signal of the access points is not similar, one of the possible options is to weight the distance between the mobile terminal and the access point depending on the relative power at which the signal is received, as depicted in FIG. 2 ($r_1$, $r_2$, $r_3$).

Figure 3:
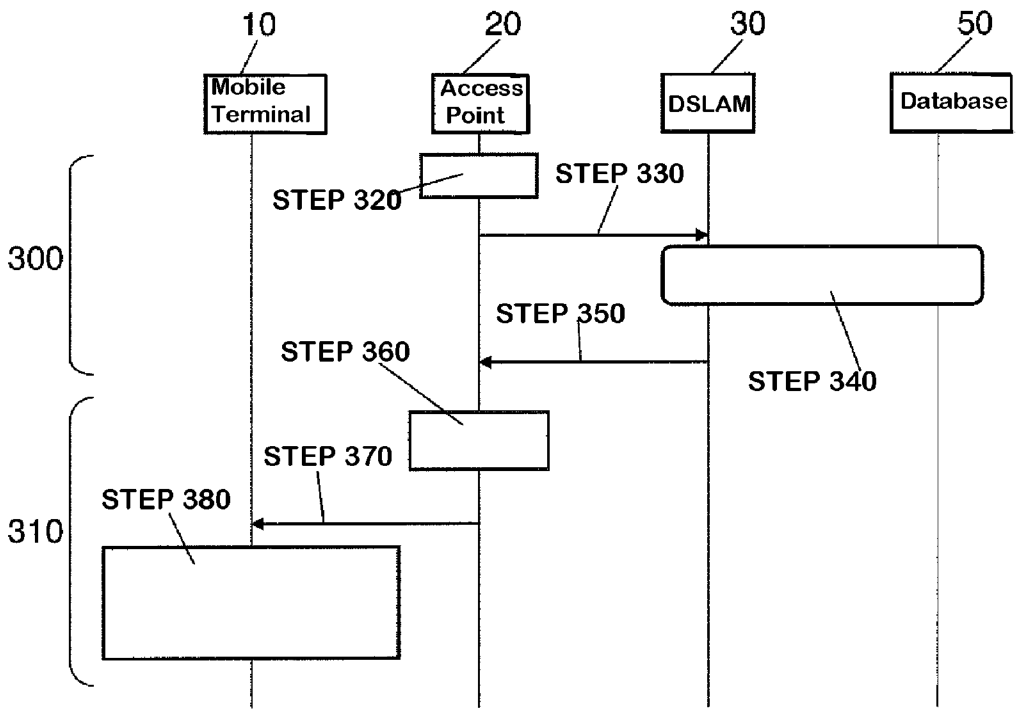
FIG. 3 shows the proposed signaling diagram.

The signaling diagram of the solution is depicted in FIG. 3. Two different phases can be seen therein. The first phase is the registration phase 300 of the access point in which the latter obtains the geographical coordinate information that is going to be posted, stored in the user database 50. Secondly, the broadcast phase 310 in which the access point posts its geographical positioning information and said information is collected by a mobile terminal, can be seen.

The initial registration phase 300 of the access point 20 begins after the same is switched on 320. During this initial registration process, the access point launches a PPP AuthenticateRequest 330 to the DSLAM 30 in a traditional manner, including the authentication credentials for the registration. The DSLAM checks 340 against the ADSL user database 50 the identity and validity of the password included in the previous AuthenticateRequest and returns, if successful, an Authenticate-ACK 350, according to the standard method included in [3]. In the Message field of the Authenticate-ACK message, the DSLAM 30 includes the information relating to the geographical coordinates of the access point, extracted directly from the user and credentials database 50.

Once the access point 20 receives the geographical coordinate information, the registration phase 300 ends and the broadcast phase 310 begins. The access point 20 has internally stored (step 360) the geographical coordinates and sends them in the SSID 370 of the wireless network. Finally, the mobile terminal estimates its geographical coordinates from one or more received signals (step 380).

Now the functionality of some of the elements shown in FIG. 1 will be described.

The geographical coordinates of the public telephone numbers (geographical numbers) having access subscription are stored in the database 50.

The element referred to as DSLAM 30 manages the registration requests from different access points and routes the IP traffic to the corresponding public IP network 40. It connects with the access point through the public basic telephony network (BTN).

In the interface between the access point 20, and more specifically the MODEM 24 of the latter and the element DSLAM 30, there is a PPP interface 70 in which the corresponding messages are exchanged during the registration phase 300 of the access point. According to [3], these messages are AuthenticateRequest (MODEM→DSLAM) and Authenticate-ACK (DSLAM→MODEM) in the case of positive registration or Authenticate-NACK (DSLAM→MODEM) in the case of negative registration. As has been explained, the recommended implementation for communicating the geographical position from the access point is for the DSLAM to send the corresponding coordinates in the Authenticate-ACK message, specifically in the multipurpose Message field, in which it is possible to transport corresponding information to upper layers without affecting the authentication protocol between the elements.

The element that will perform the tasks of modulation/demodulation towards the public basic telephony network (BTN), the MODEM 24, is defined in the element generically referred to as "Access point" 20. The MODEM performs tasks of adapting communication physical layer protocols to go, for example, from a radio link to a cable link. This element will receive its positioning information, stored in the geographical position Database (50) for each telephone number. Upon receiving that information, the MODEM will include it in the radio signal which will be posted for all the users to enable connection to the access point. Therefore, in this embodiment the MODEM corresponds to the means for obtaining the geographical positioning information of an entity located in a telephone network defined in the claims.

The access point 20 further comprises the router 22, which performs tasks of routing IP traffic over the different physical layer protocols. In this case it is of a physical protocol 802.11. In this embodiment the router corresponds to the means for sending data to one or more mobile terminals defined in the claims.

However, it is possible to assign the functionality of obtaining the geographical information from the access point and to send these data to the mobile terminals to any of the two nodes, the MODEM 24 and the router 22, or to the two nodes as a whole.

The wireless interface 60 between the access point and the mobile terminal 10, in the particular case of WiFi connections, is defined by the IEEE 802.11 standard. This standard defines the broadcast messages which are used by the access point for posting its identity and other data, so that near-by wireless devices (mobile terminals) can connect to the access point. These broadcasts are referred to as beacons. There are several fields in these messages which are posted by the access point, including the "Parameter sets" field, where multipurpose information is stored. A possible implementation is to include in this field the geographical information sent by the DSLAM in the registration step. In the particular event that there is another type of wireless interface between the elements, the preferred implementation is similar to the preceding implementation for the case of IEEE 802.11.

A MODEM 12 performing tasks of modulation/demodulation between the internal traffic of the mobile terminal and the traffic exchanged with the access point is included in the mobile terminal 10. The tasks of this element are to adapt the 802.11 physical layer protocol. The MODEM corresponds to the means for receiving data from at least one access point defined in the claims.

The mobile terminal optionally comprises a module 14 performing the corresponding mathematical calculations intended for suitably estimating the position of the mobile terminal, such as those related to triangulating signals or weighting such signals, depending on the power received. The module corresponds to the means for estimating the position of the mobile terminal defined in the claims.

Although the invention has been illustrated and described in detail in the drawings and in the preceding description, such illustration and description must be considered as illustrative or exemplary and not restrictive; the invention is not limited to the disclosed embodiments.

For example, though the preferred embodiment of the invention uses the IEEE 802.11 protocol, the invention can be extended to other types of non-cellular wireless access technologies, such as WiMAX or others to be identified or defined in the future.

Other variations to the disclosed embodiments can be understood and carried out by persons skilled in the art when putting the claimed invention into practice, from studying the drawings, the description and the attached claims. In the claims, the expression "comprising" does not exclude other elements or steps, and the indefinite article "a" or "an" does not exclude a plurality. A single processor or other unit can perform the functions of several elements mentioned in the claims. The mere fact that certain measurements are mentioned in the dependent claims which are different from one another does not mean that a combination of these measurements cannot be used in a more advantageous manner. A computer program can be stored/distributed in a suitable support, such as an optimal storage support or a solid state support supplied with or as part of other hardware, but it can also be distributed in other manners, such as through the Internet and other wired or wireless telecommunication systems. Any reference sign in the claims must not be interpreted as being a limit to the scope.

LITERATURE

[1] IETF RFC 1661 "The Point-to-Point Protocol (PPP)"

[2] IETF RFC 1994 "PPP Challenge Handshake Authentication Protocol (CHAP)"

[3] IETF RFC 1334 "PPP Authentication Protocols"

[4] IEEE 802.11, 1999 Edition (ISO/IEC 8802-11: 1999) IEEE Standards for Information Technology—Telecommunications and Information Exchange between Systems—Local and Metropolitan Area Network—Specific Requirements—Part 11: Wireless LAN Medium Access Control (MAC) and Physical Layer (PHY) Specifications

[5] 3GPP TS 23.171 "Location Services (LCS); Functional description; Stage 2 (UMTS)".

The invention claimed is:

1. Access point for a non-cellular wireless communication system comprising:

means for obtaining geographical positioning information of an entity located in a telephone network, said entity located in the telephone network is a digital subscriber line access multiplexer, wherein the means for obtaining the geographical positioning information of the entity are configured for the access point to obtain geographical positioning information of the access point in a registration or access permission checking step, and means for sending data for sending said geographical positioning information of the access point from the access point to the mobile terminals, wherein the means for sending data are configured to send data to one or more mobile terminals.

2. Access point according to claim 1, wherein the means for sending the data are configured for sending the geographical positioning information of the access point by means of broadcast.

3. Access point according to claim 2, wherein the means for sending the data are configured for sending the geographical positioning information of the access point in beacons.

4. Access point according to claim 3, wherein the means for sending the data are configured for sending the geographical positioning information of the access point in the Service Set Identifier.

5. Access point according to claim 1, wherein the registration step is performed on a PPP protocol.

6. Access point according to claim 1, wherein said access point comprises an administration interface so that an access point administrator provides the geographical positioning information of the access point to the access point.

7. Access point according to claim 1, wherein the means for sending the data work according to the WiFi or WiMax protocol.

8. A non-transitory computer readable medium having a program stored thereon for executing a computer to perform the steps of claim 1, when said program is run in a computer.

* * * * *